INVENTORS
JAMES VANI
ALBERT J. MALPEDE
BY
Wallace and Cannon
ATTORNEYS

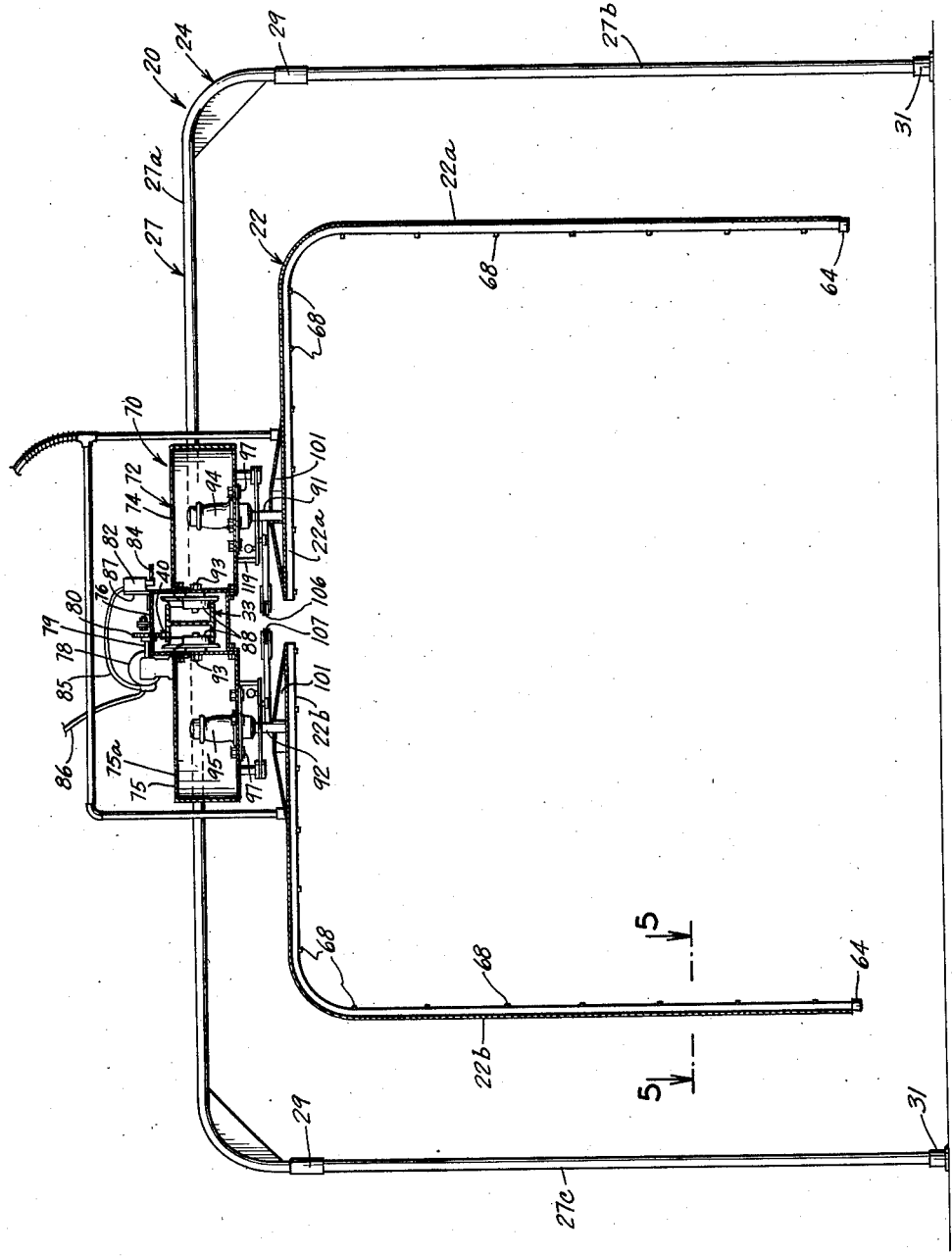

April 27, 1954     J. VANI ET AL     2,676,600
CAR WASHING APPARATUS

Filed Jan. 19, 1951     5 Sheets-Sheet 3

INVENTORS
JAMES VANI
ALBERT J. MALPÉDE
BY

*Wallace and Cannon*

ATTORNEYS

April 27, 1954  J. VANI ET AL  2,676,600
CAR WASHING APPARATUS
Filed Jan. 19, 1951  5 Sheets-Sheet 4
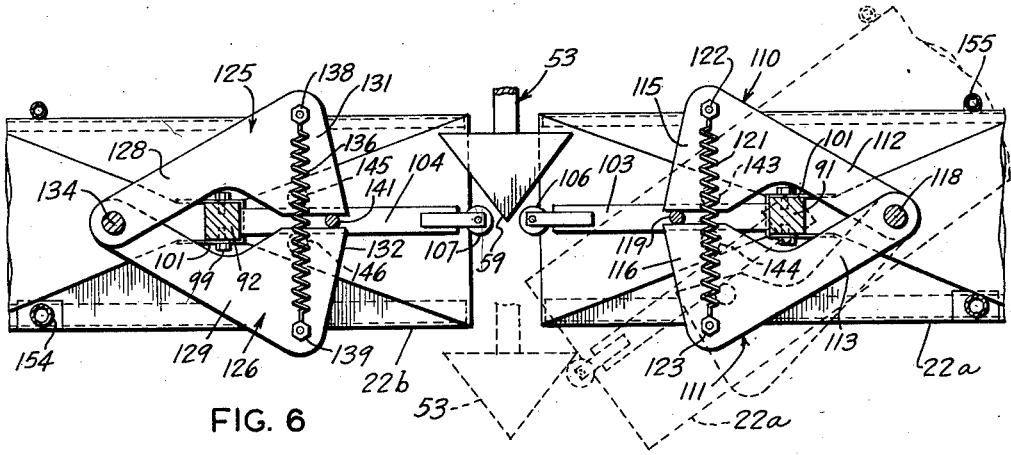
FIG. 6
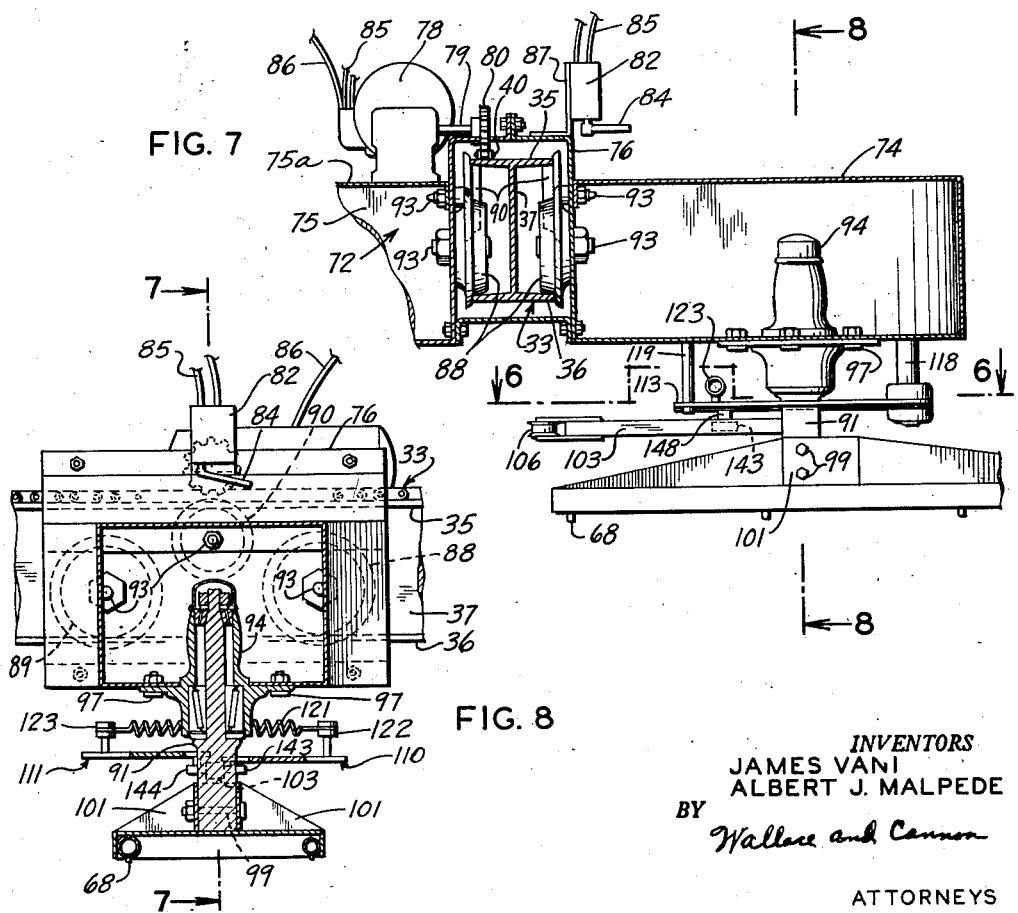
FIG. 7
FIG. 8
INVENTORS
JAMES VANI
ALBERT J. MALPEDE
BY
Wallace and Cannon
ATTORNEYS April 27, 1954
J. VANI ET AL
2,676,600
CAR WASHING APPARATUS
Filed Jan. 19, 1951
5 Sheets-Sheet 5
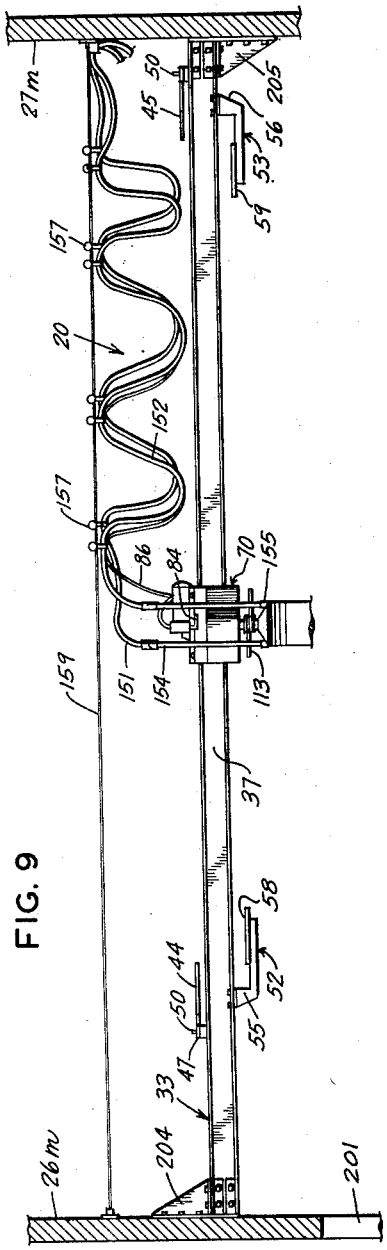
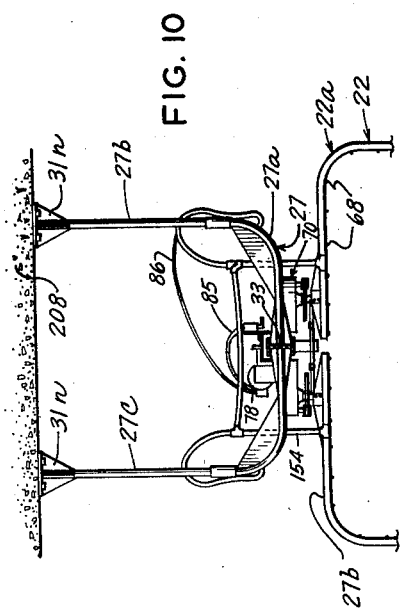
INVENTORS
JAMES VANI
ALBERT J. MALPEDE
BY
ATTORNEYS Patented Apr. 27, 1954

2,676,600

UNITED STATES PATENT OFFICE 2,676,600

CAR WASHING APPARATUS

James Vani and Albert J. Malpede, Chicago, Ill., assignors to Service Metal Fabricators, Inc., Chicago, Ill., a corporation of Illinois Application January 19, 1951, Serial No. 206,822

13 Claims. (Cl. 134—123)

This invention relates to vehicle washers and more particularly to vehicle washers of the type that are adapted to move back and forth across vehicles to be washed and to direct a plurality of sprays of liquid against the vehicles during such movement.

The present invention is an improvement upon the vehicle washer which forms the subject matter of our co-pending United States patent application, Serial No. 152,358, filed March 28, 1950.

A primary object of our invention is to provide a novel vehicle washer of the general type shown in our aforementioned co-pending application, and embodying novel improvements thereover.

A further object is to provide a novel vehicle washer of the aforementioned type embodying spraying devices which are movable longitudinally across a vehicle to be washed and which are movable laterally across the ends of the vehicle in a novel and expeditious manner to thereby spray the outer surface of the vehicle in an efficient novel manner.

Another object of our invention is to provide a novel vehicle washer of the aforementioned type wherein movement of the spray unit is effected, and is controlled, in a novel and expeditious manner.

Other and further objects of the present invention will be apparent from the following description and claims and are illustrated in the accompanying drawings which, by way of illustration, show preferred embodiments of the present invention and the principles thereof and what we now consider to be the best mode in which we have contemplated applying these principles. Other embodiments of the invention embodying the same or equivalent principles may be used and structural changes may be made as desired by those skilled in the art without departing from the present invention and the purview of the appended claims.

In the drawings:

Fig. 2 is a transverse sectional view of the apparatus shown in Fig. 1;

Fig. 6 is a detail sectional view taken substantially along the line 6—6 in Fig. 7;

Fig. 7 is a detail sectional view of a portion of the apparatus shown in Fig. 2;

Fig. 8 is a detail sectional view taken substantially on the line 8—8 in Fig. 7;

Fig. 9 is a side elevational view of a portion of a vehicle washing apparatus illustrating a modified form of our invention; and Fig. 10 is a transverse sectional view of a portion of an apparatus embodying the principles of our invention and illustrating another modified form thereof.

Figure 1:
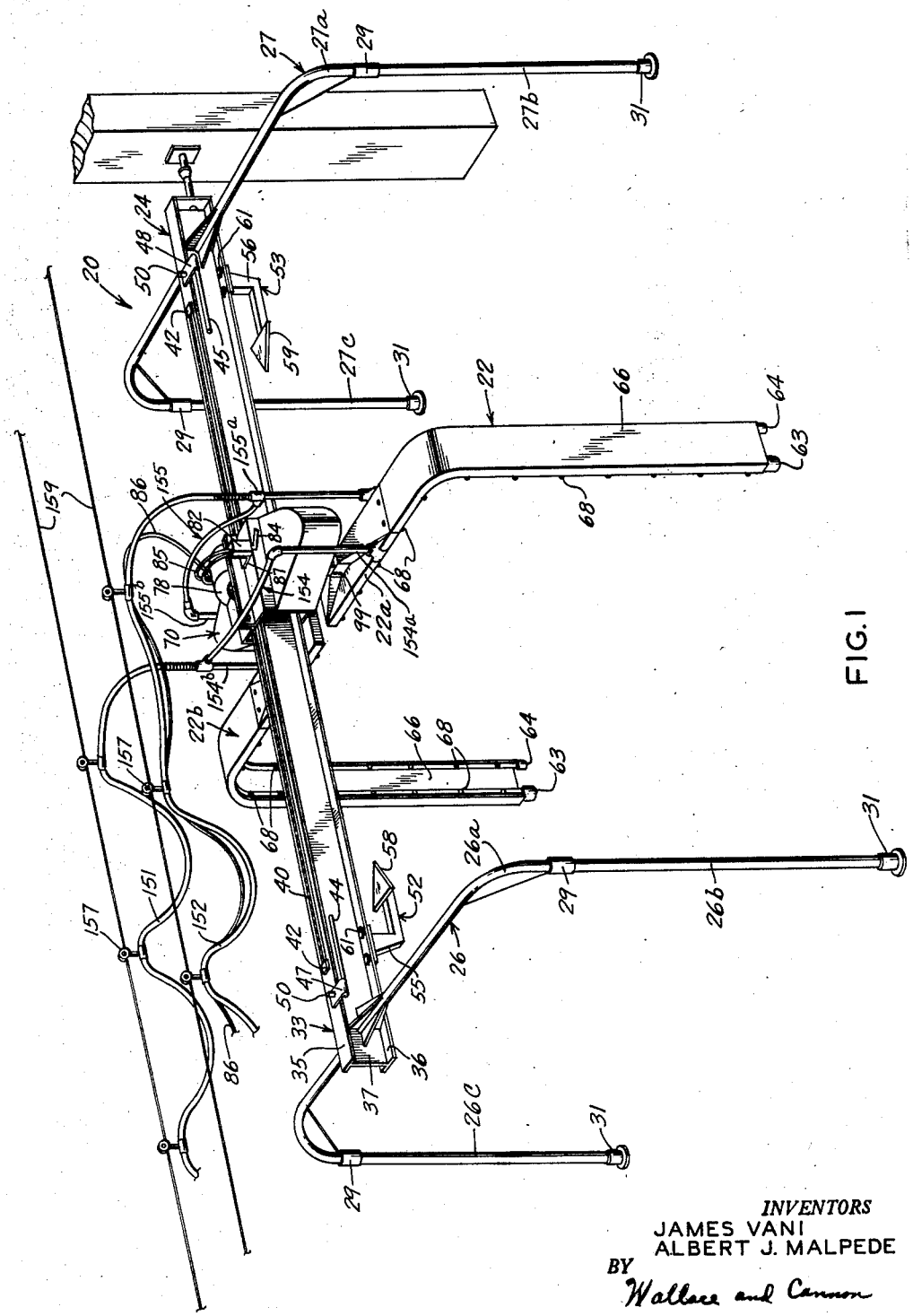
Fig. 1 is a perspective view of a vehicle washing apparatus embodying the principles of our invention.
Figure 4:
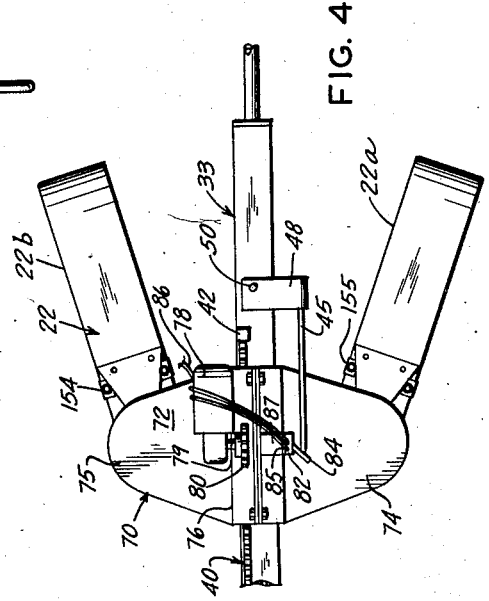
Fig. 4 is a detail top plan view of a portion of the apparatus shown in Fig. 3.

For the purpose of illustrating the principles of our invention, a vehicle washer 20, comprising the preferred embodiment of our invention is shown in Figs. 1 to 8, inclusive of the drawings, and comprises in general, a spray unit 22 movable longitudinally of an elongated stand or supporting frame 24. The spray unit 22 embodies two sections 22a and 22b which are pivotally supported by the stand 24 for swinging movement transversely thereof when the spray unit 22 approaches either end of the stand 24 during longitudinal movement relative thereto as will be presently described in greater detail.

The stand or supporting frame 24 embodies two substantially arch-shaped supports or standards 26 and 27, the standards 26 and 27 each having substantially inverted U-shaped cross bars 26a and 27a, respectively, and the cross bars 26a and 27a each being supported by two vertical legs 26b and 26c, and 27b and 27c, respectively. The cross bars 26a and 27a are connected to the upper end portions of the respective legs 26b and 26c and 27b and 27c, by suitable coupling members such as collars or couplings 29. The lower end portions of the legs 26b and 26c, 27b and 27c are mounted on a suitable supporting member, such as, for example, the floor of a garage or the like, and may be firmly attached thereto by suitable means such as coupling members 31.

A suitable beam 33 is mounted on and extends between the cross bars 26a and 27a to afford the track along which the spray unit 22 is moved during a vehicle washing operation. The type of structural member which we prefer to use for the beam 33 comprises an I-beam having a top flange 35 and a lower flange 36 interconnected by a central web 37. A suitable rack, such as for example, an elongated sprocket chain 40 is mounted on and extends longitudinally along one edge portion of the top face of the web 35, and the chain 33 and is secured thereto by suitable means such as clips 42 attached to each end of the sprocket chain 40 and to the upper face of the web 35 by suitable means such as welding.

Two rods 44 and 45 are secured to opposite ends of the top flange 35 of the I-beam 33 by suitable means such as brackets 47 and 48 secured to the flange 35 by screws or bolts 50, the rods 44 and 45 projecting toward each other from the brackets 47 and 48, respectively. Also, two abutment members 52 and 53 embodying two substantially L-shaped arms or brackets 55 and 56, respectively, having a triangular-shaped or wedge-shaped plate 58 and 59 mounted on the free end portion of one leg thereof, respectively, are mounted on opposite end portions of the flange 36 of the I-beam 33, and are secured in depending relation thereto by suitable means such as bolts 61 with the plates 58 and 59 projecting toward each other in spaced relation below the flange 36.

Each of the two sections 22a and 22b of the spray unit 22 embodies two substantially inverted L-shaped pipes or conduits 63 and 64 disposed in parallel relation to each other and supported in such relation to each other by a cover member or supporting plate 66 mounted on the outwardly disposed face of the two conduits 63 and 64 of the respective section 22a and 22b. A plurality of spray nozzles 68 are mounted on, and project from each of the conduits 63 and 64 in spaced relation to each other longitudinally along the inwardly disposed face thereof, or, in other words, on the face opposite that to which the cover member 66 is attached.

A power unit 70 is mounted on the I-beam 33 and affords means for supporting the spray unit 22, and for moving the latter longitudinally along the I-beam 33 as will be discussed in greater detail presently.

The power unit 70, Figs. 1, 2 and 7, embodies a housing 72 having two substantially box-shaped end sections 74 and 75 connected together by a substantially inverted U-shaped bracket or intermediate section 76. A suitable drive unit such as, for example, a reversible motor 78 is mounted on the top wall 75a of the end section 75 of the housing 72, and has a drive shaft 79, Figs. 2 and 7, on the free end portion of which a gear or sprocket 80 is mounted in position to operatively engage the rack or sprocket chain 40 on the top face of the flange 35 of the I-beam 33. A control switch or reversing switch 82, Figs. 1, 2 and 3, having a horizontally projecting control rod 84 depending therefrom, is mounted on the intermediate portion 76 of the housing 72, by suitable means such as a bracket 87 in such position that the control rod 84 is disposed in horizontal alignment with the push rods 44 and 45 mounted on the flange 35 of the I-beam 33. The control switch 82 is connected to the motor 78 by suitable means such as wires 85 and pivotal movement of the control rod 84 relative to the casing of the switch 82 is effective to reverse the operation of the motor 78 to thereby reverse the rotation of the sprocket wheel 80. The motor 78 is connected through the switch 82 to a suitable source of power, such as a generator, or a wall plug, not shown, by the wires 85 and a flexible cable or cord 86.

The housing 72 and therefore the power unit 70 is supported on the I-beam 33 by two sets of rollers engaged with the flanges 35 and 36 on opposite sides of the web 37, Figs. 2, 7 and 8, each of the sets of rollers embodying two end rollers 88 and 89, and an intermediate roller 90, Fig. 8. The rollers in the respective sets are journaled on suitable means such as, shafts 93 carried by the respective adjacent end sections 74 and 75 of the housing 72. The two end rollers 88 and 89 are so disposed on the housing 72 that they engage the lower flange 36 and the intermediate rollers 90 are so disposed on the housing 72 that they engage the upper flange 35. Thus, it will be seen that the power unit 70 may be readily moved along the I-beam 33, the rollers 88—90 firmly holding the power unit 70 against transverse movement relative to the I-beam 33.

The two sections 22a and 22b of the spray unit 22 are mounted on, and suspended from, the end sections 74 and 75 of the housing 72 by substantially vertically extending shafts 91 and 92, respectively, Figs. 2, 7 and 8, the shafts 91 and 92 having their upper end portions journaled in suitable bearings 94 and 95 connected to the end sections 74 and 75 of the housing, respectively, by suitable means such as bolts 97. The lower end portions of the shafts 91 and 92 are connected to the upper faces of the sections 22a and 22b of the spray unit 22 by bolts 99, Figs. 7 and 8, extending through the shafts 91 and 92 into brackets 101 secured to the upper face of the sections 22a and 22b by suitable means such as welding.

Two rods or arms 103 and 104 having rollers 106 and 107 rotatably mounted on one end thereof respectively, are mounted at their other ends to respective ones of the shafts 91 and 92 and are so disposed thereon that during normal movement of the spray unit 22 longitudinally along the beam 33 the arms 103 and 104 project inwardly toward each other from the shafts 91 and 92, the rollers 106 and 107 being disposed in spaced but relatively closely adjacent relation to each other.

Two substantially L-shaped plates 110 and 111, Figs. 6 and 8, having a long leg 112 and 113, and a short leg 115 and 116, respectively, are pivotally mounted on the lower end portion of a shaft 118 projecting downwardly from the lower face of the end section 74 of the housing 72 and extending through the free end portions of the long legs 112 and 113 of the plates 110 and 112 respectively. The plates 110 and 111 are mounted on the shaft 118 in opposed relation to each other, with the free end portion of the long leg 113 of the plate 111 overlying the free end portion of the long leg 112 of the plate 110. A pin 119 projects downwardly from the lower face of the end section 74 of the housing 72 and extends between the free end portions of the short legs 115 and 116 of the L-shaped plates 110 and 111 to thereby hold the ends of the plates 110 and 111 on which the short legs 115 and 116 are disposed in spaced relation to each other. A tension coil spring 121 is connected at one end by a bolt 122 to the plate 110 and at its other end by a bolt 123 to the plate 111 and is effective to urge the plates 110 and 111 to pivot on the shaft 118 in a direction whereby the free end portions of the short legs 115 and 116 are urged toward engagement with the pin 119.

Similarly, two substantially L-shaped plates 125 and 126, Fig. 6, having long legs 128 and 129 and short legs 131 and 132 are pivotally mounted on the lower end portion of a shaft 134 depending from the lower face of the end section 75 of the housing 72 with the free end portion of the leg 128 of the plate 125 disposed in overlying relation to the free end portion of the leg 129 of the plate 126, and the free end portions of the short legs 131 and 132 are urged by a spring 136, connected to the plates 125 and 126 by bolts 138 and 139, toward engagement with a pin 141 depending from the lower face of the end section 75 of the housing 72.

Four rollers 143, 144, 145 and 146 are rotatably mounted on individual shafts 148 from which they are suspended from the lower face of the free end portions of the short legs of the plates 110, 111, 125 and 126, respectively. The rollers 143 and 144 are so disposed on the plates 110 and 111 that, when the plates 110 and 111 are disposed in position wherein the free end portions of the leg 115 and 116 are engaged with the pin 119, the rollers 143 and 144 are engaged with opposite sides of the rod 103. Similarly, the rollers 145 and 146 are so disposed on the plates 125 and 126 that, when the free end portions of the short legs 131 and 132 of the plates 125 and 126 are engaged with the pin 141, the rollers 145 and 146 are engaged with opposite sides of the rod 104. Thus, it will be seen that the spring 121, acting through the plates 110 and 111 and the rollers 143 and 144, respectively, is effective to urge the rod 103 and therefore, the shaft 91 into the position shown in Fig. 6 wherein the rod 103 is disposed in alignment with the rod 104. Likewise, it will be seen that the spring 136, acting through the plates 125 and 126 and the rollers 145 and 146 respectively, is effective to urge the rod 104, and therefore, the shaft 92 into the position shown in solid lines in Fig. 6 wherein the rod 104 is disposed in alignment with the rod 103.

From the foregoing, it will be seen that the two sections 22a and 22b of the spray unit 22 are pivotally mounted by the shafts 91 and 92 respectively, from the power unit 70 and are normally yieldingly held in substantially aligned relation to each other, as shown in Figs. 1 and 6, by the springs 121 and 136 and associated mechanism. However, as will be discussed in greater detail presently, upon pivotal movement of the rods 103 and 104 and, therefore, the shafts 91 and 92, in a clockwise or counter-clockwise direction, as viewed in Fig. 6, the sections 22a and 22b, respectively, of the spray unit 22 are rotated with the shafts 91 and 92 in a corresponding direction against the urging of the springs 121 and 136, respectively.

Two hoses 151 and 152, Figs. 1 and 2, are connected at one end by suitable coupling units 154 and 155 to the conduits 63 and 64, respectively, in each of the sections 22a and 22b of the spray unit 22. The coupling unit 154 has two branches 154a and 154b connected to the conduits 63 in the sections 22a and 22b, respectively, and, likewise, the coupling unit 155 has two branches 155a and 155b connected to the conduits 64 in the sections 22a and 22b, respectively. The other end portions of the hoses 151 and 152 are connected to suitable pumping units, or the like, not shown, for feeding clear water, and a cleansing solution through the hoses 151 and 152, respectively, into the conduits 63 and 64 for discharge through the nozzles 68 onto the vehicle to be cleaned. The central portions of the hoses 151 and 152, between the aforementioned end portions thereof, are preferably supported above the I-beam 33, for movement longitudinally therealong, by trolleys 157 movably mounted on wires or cables 151 and 152 disposed above the beam 33 in parallel relation thereto, the ends of the cables 151 and 152 being attached to suitable supporting members, not shown, such as the walls of the garage within which our unit is to be used. The lead-in cord or cable 86 for the motor 78 may also be supported by the trolleys 157 for movement longitudinally of the beam 33.

Figure 3:
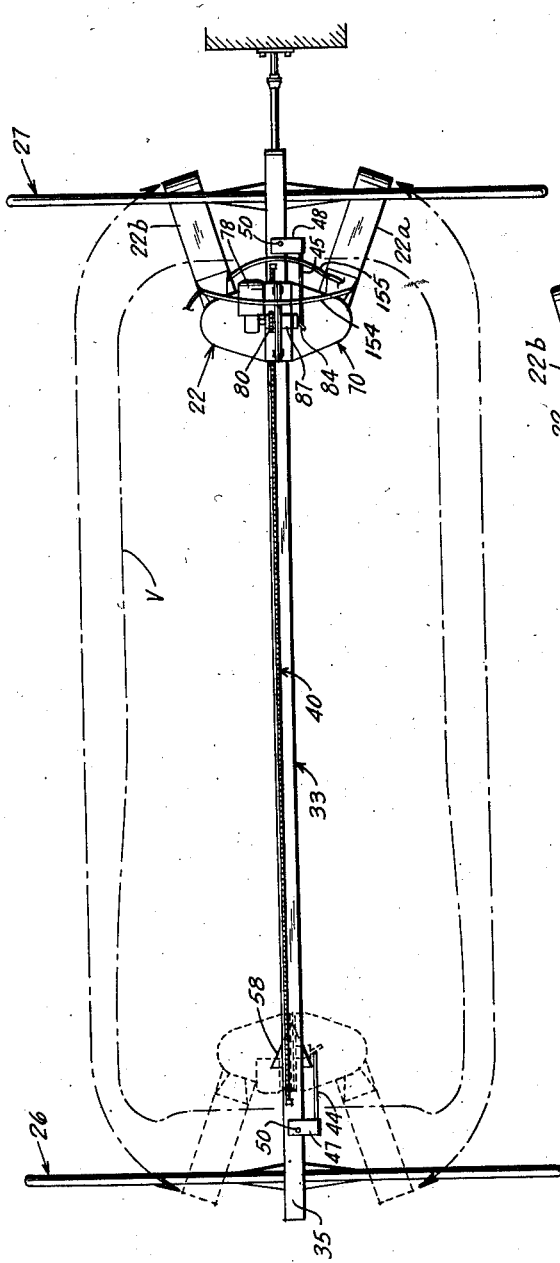
Fig. 3 is a top plan view of the apparatus shown in Fig. 1 with certain parts thereof disposed in different positions.
Figure 5:
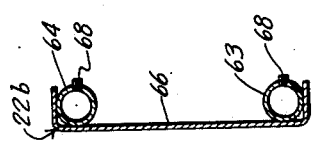
Fig. 5 is a detail sectional view taken substantially along the line 5—5 in Fig. 2.

In the operation of the novel vehicle washing apparatus shown in Figs. 1 to 8, inclusive, an automobile may be driven through the arch of the support 26 into position under the beam 33, in which position the automobile is disposed in substantially parallel relation to the beam 33, as indicated in broken lines in Fig. 3. The pumping unit, not shown, connected to the hose 151 may then be placed in operation by the operator to pump cleansing solution through the hoses 151 for discharge from the nozzles 68 of the pipes 63 onto the top and sides of the automobile. The operator may then close a switch, not shown, to initiate operation of the motor 78 to thereby cause the sprocket wheel 80 to rotate and, through its engagement with the stationary rack or sprocket chain 40, cause the spray unit 22 to move longitudinally along the beam 33. The direction of this initial movement of the spray unit 22 along the beam 33 depends of course, on the position of the control lever 84 on the switch 82 and for the purpose of explaining the operation of our unit, it will be assumed that the initial movement is toward the end of the beam 33 on which the abutment 53 is located or, in other words, to the right, as viewed in Figs. 1 and 3. During this initial movement of the spray unit 22 to the right as viewed in Fig. 3, the sections 22a and 22b are disposed substantially in alignment with each other as shown in Fig. 1 so that the nozzles 68 are effective to discharge cleansing solution substantially perpendicularly onto the top and sides of the automobile V. As the spray unit 22 approaches the right end of the beam 33, as viewed in Fig. 1, the rollers 106 and 107 on the arms 103 and 104 engage the wedge plate 59 on the abutment 53 and, as the movement of the spray unit 22 progresses, the pressure of the wedge plate 59 on the rollers 106 and 107 causes the arms 103 and 104 and the shafts 91 and 92 to rotate in a counterclockwise and clockwise direction respectively, as viewed in Figs. 2 and 6, to thereby swing the sections 22a and 22b of the spray unit 22 in corresponding directions around the front end of the automobile V. When the sections 22a and 22b of the spray unit 22 have moved substantially to the front end of the automobile V, as shown in solid lines in Fig. 3, the push rod 45 engages the control lever 84 on the switch 82 and thereby rotates the control lever 84 to the left as viewed in Fig. 1, in which position the switch 82 is effective to reverse the operation of the motor 78 and thereby reverse the rotation of the sprocket wheel 80 and cause the spray unit 22 to be moved to the left along the beam 33.

As is best seen in Fig. 6 when the wedge plate 59 engages the roller 106 and causes the arm 103 and therefore, the shaft 91 to rotate in a counterclockwise direction from the position shown in solid lines to the position shown in broken lines therein, the rotation of the shaft 91 is effective to swing the section 22a of the spray unit 22 in a counterclockwise direction to thereby move the downwardly depending legs of the pipes 93 and 94 around to the front of the automobile V and thereby direct the sprays issuing from the nozzles 68 onto the front end portion of the automobile. During this movement of the rod 103 and the shaft 91, it will be seen that the plate 110 is held in its normal position by the pin 119, and the plate 111 is pivoted around the shaft 118 by the rod 103 which presses against the roller 144 on the plate 111. Thus, it will be seen that the tension on the spring 121 is increased and thereby affords a force yieldingly urging the section 22a of the spray unit 22 to return to the normal position shown in solid lines in Fig. 6. Therefore, during reverse movement of the spray unit 22 along the beam 33, or in other words, to the left as viewed in Fig. 1, it will be seen that the spring 121 acting through the plate 113 and the roller 144 is effective to pivot the arm 103 and, therefore, the shaft 91, in a clockwise direction as viewed in Fig. 6, so that as the roller 106 rides off from the wedge plate 59 the arm 103 and the shaft 92 is returned to the normal position shown in solid lines in Fig. 6. Obviously, of course, the spring 136 and the plate 126 is effective in a similar manner on the rod 104 and the shaft 92 to control the movement of the section 22b of the spray unit 22.

Toward the other end of the movement of the spray unit 22 to the left along the beam 33 as viewed in Fig. 1 the rollers 106 and 107 engage the wedge plate 58 on the abutment 52 and thereby cause the sections 22a and 22b to pivot on the power unit 70 around the rear end of the vehicle V into the position shown in broken lines in Fig. 3.

During this movement of the sections 22a and 22b of the spray unit 22, it will be seen that the plates 110 and 125 are pivoted by the rods 103 and 104 around the shafts 118 and 134 while the plates 111 and 126 remain in the position shown in solid lines in Fig. 6, and therefore, the springs 121 and 136 are again effective to urge the sections 22a and 22b back toward normal position. Upon completion of the swinging movement of the sections 22a and 22b of the spray unit 22 the push rod 44 engages the control lever 84 on the reversing switch 82 and thereby press it back into its initial position to thereby cause the motor 78 to again reverse and drive the spray unit 22 in a reverse direction or in other words, to the right, as viewed in Fig. 1.

During this reverse movement of the spray unit 22, as the spray unit 22 moves past the initial position it occupied relative to the vehicle V at the start of the washing operation, the operator may change the feed setting of the pumping unit, not shown, to thereby cut off the flow of cleansing solution through the hose 151 and the conduits 63, and cause clear rinsing liquid, such as plain water, to be fed through the hose 152 and the conduits 64, and sprayed from the nozzles 68 on the conduits 64 onto the vehicle V. The spray unit 22 is then permitted to make another complete cycle of operation, or, in other words, to make another complete reciprocation along the beam 33, with the sections 22a and 22b of the spray unit 22 swinging around the corresponding end of the vehicle V at each end of the reciprocation, as previously discussed, to thereby effectively rinse the top, sides, front and rear of the vehicle.

After the vehicle has been rinsed in this manner, the master switch, not shown, may be opened to stop the motor 78 to thereby stop movement of the spray unit 22 along the beam 33, and the valves on the pump unit may be closed to thereby stop the flow of liquid through the hoses 151 and 152 and from the nozzles 68 and the vehicle may be driven out from under the support 26.

Thus, from the foregoing, it will be seen that the movement of the spray unit 22 including the swinging movements of the sections 22a and 22b around the front and rear end portions of the automobile V, and including the reversal of movement of the spray unit 22 at each end of the beam 33, is entirely automatically controlled.

Also, it will be seen that our novel vehicle washer as shown in Figs. 1 to 8, inclusive, affords a compact, relatively simple device which may be economically manufactured and which affords a practical, efficient washing apparatus for cleaning vehicles, such as automobiles and the like.

It will be understood, of course, that, if desired, a complete washing cycle of operation, and a complete rinsing cycle of operation may be more than one complete reciprocation of the spray unit 22 along the beam, the operator, in such instances, merely delaying opening and closing of the washing and rinsing valves until the spray unit has made the desired number of reciprocations.

The modified forms of our machine which we have shown in Figs. 9 and 10, operate on the same principle as the preferred form of the machine illustrated in Figs. 1 to 8, inclusive, and like reference numerals have been used on like parts, and the same reference numerals with the suffixes "m" and "n" have been used on parts shown in Figs. 9 and 10, respectively, which are similar but which have been substituted for parts of the preferred form of our invention.

It will be noted that all of the changes made in the modified forms of our invention over the preferred form as shown, are embodied in the supporting structure for the beam 33.

Thus, in the modified form of our invention, shown in Fig. 9, the arch-shaped standards 26 and 27 have been eliminated and the beam 33 has been directly connected to suitable wall structures such as, for example, an end wall 27m and a suitable partition wall 26m of the garage or the like, in which the apparatus 20 is installed. It will be seen that the wall 27m may be solid to afford a closed end for the apparatus 20 if desired, and that a doorway 201 is afforded in the wall 26m through which the vehicle to be washed may be driven into position under the beam 33 of the apparatus 20.

The ends of the beam 33 are preferably connected by suitable brackets 204 and 205 to the walls 26m and 27m, respectively.

In the modified form of our invention shown in Fig. 10, the standards 26 and 27 have been rotated vertically 180° into position wherein the U-shaped cross bars are disposed at the lower end portion thereof and the legs of the standards project upwardly and are connected by brackets 31n to a suitable overhead supporting structure such as, for example, a ceiling beam 208 of the garage, or the like, in which our novel apparatus is to be used. Thus in the sectional view shown in Fig. 10, it will be seen that the cross bar 27a of the standard 27 is disposed in inverted position from that shown in Fig. 1, and the legs 27b and 27c project upwardly therefrom and are connected by brackets 31n to an overhead support 208.

From the foregoing, it will be seen that we have provided a novel vehicle washing apparatus which may be quickly and easily installed in a garage, or the like, for washing vehicles such as, for example, automobiles, and the like, and that our novel apparatus affords a practical, compact and efficient apparatus for washing such vehicles, and may be economically manufactured commercially.

In addition, it will be seen that we have afforded a novel vehicle washing apparatus that embodies spraying devices that are movable both longitudinally and laterally across a vehicle in a novel and expeditious manner to thereby effectively spray the outer surface of the vehicle in a novel manner.

Furthermore, it will be seen that we have afforded a novel vehicle washing apparatus which may be effectively supported in various ways.

Thus, while we have illustrated and described the preferred embodiments of our invention, it is to be understood that these are capable of variation and modification, and we therefore do not wish to be limited to the precise details set forth, but desire to avail ourselves of such changes and alterations as fall within the purview of the following claims:

We claim:

1. A vehicle washing apparatus comprising elongated supporting means, an elongated spray unit mounted on said means for movement longitudinally of said supporting means along a predetermined path of travel in a direction transverse to the length of said spray unit, drive means connected to said spray unit for reciprocating said spray unit along said predetermined path of travel, and means disposed in said path of travel and engageable with said drive means for effecting movement of said spray unit transversely to said supporting means at an end of said path of travel.

2. A vehicle washer for automobiles and the like, comprising elongated supporting means, a spray unit mounted on said means for movement longitudinally thereof, said spray unit having two sections disposed in position relative to each other for movement along opposite sides of such a vehicle during said movement longitudinally of said supporting means, drive means operatively connected to said spray unit for reciprocating said spray unit longitudinally of said supporting means along a predetermined path of travel, and means mounted in said path of travel and engageable with said drive means for effecting swinging movement of said sections of said spray unit toward and away from each other transversely to said supporting means at each end portion of said path of travel.

3. In a vehicle washing apparatus for automobiles and the like, an elongated beam, means for supporting the beam in elevated substantially horizontally extending position in substantially vertical alignment over such a vehicle to be washed, a substantially inverted U-shaped spray unit having two downwardly extending legs, means mounted on said beam and operatively connected to said spray unit, movably supporting said spray unit on said beam for reciprocation longitudinally along the latter, means including a reversible motor mounted on said last mentioned means and operatively connected to said beam for moving said spray unit longitudinally along said beam over a predetermined path of travel, means mounted on said supporting means and said beam for reversing the operation of said motor at each end of said path of travel of said spray unit to thereby automatically effect reciprocation of said spray unit along said path of travel, and means mounted on said beam in position to engage said drive means for swinging said two legs toward and away from each other at each end portion of said path of travel.

4. In a vehicle washing apparatus for automobiles and the like, an elongated beam, means for supporting the beam in elevated substantially horizontally extending position in substantially vertical alignment over such a vehicle to be washed, a substantially inverted U-shaped spray unit, means mounted on said beam and operatively connected to said spray unit and movably supporting said spray unit on said beam for reciprocation longitudinally along the latter, means including a reversible motor mounted on said second mentioned means and operatively connected to said beam for moving said spray unit longitudinally along said beam over a predetermined path of travel, and means for reversing the operation of said motor to thereby reverse the movement of said housing and spray unit at each end of said path of travel, said last named means comprising a control switch operatively connected to said motor and having a control member thereon movable between two positions for reversing the operation of said motor, and two push rods, each of said push rods being mounted on said beam adjacent respective ends of said path of travel and projecting from said beam into position to operatively engage said control member and move said control member from one of said positions to the other when said spray unit reaches said respective end of said path of travel to thereby reverse the operation of said motor and reverse the movement of said spray unit along said beam.

5. In a vehicle washing apparatus for automobiles and the like, an elongated beam, means for supporting the beam in elevated substantially horizontally extending position, a substantially inverted U-shaped spray unit, means operatively connected to said beam and spray unit supporting the spray unit on said beam for movement along a predetermined path of travel longitudinally along said beam for movement longitudially across such a vehicle to be washed, and means for moving said spray unit along said path of travel, said last named means comprising a rack mounted on said beam and extending longitudinally therealong, a gear wheel operatively engaged with said rack, and a motor mounted on said last mentioned supporting means and operatively connected to said gear wheel for rotating said gear wheel and thereby advancing said last mentioned supporting means and said spray unit longitudinally along said rack and said beam.

6. In a vehicle washing apparatus for automobiles and the like, an elongated beam, means for supporting the beam in elevated substantially horizontally extending position, a substantially inverted U-shaped spray unit having two downwardly extending legs disposed on opposite sides of said beam, means operatively connected to said beam and spray unit supporting the spray unit on said beam for movement along a predetermined path of travel longitudinally along said beam for movement longitudinally across such a vehicle to be washed, and means for moving said spray unit along said path of travel, said last named means comprising an elongated sprocket chain mounted on said beam in longitudinally extending relation thereto along said path of travel and connected at each end to said beam, a sprocket wheel operatively engaged with said chain, and a motor mounted on said last mentioned supporting means and operatively connected to said sprocket wheel for rotating said wheel and thereby advancing said spray unit longitudinally along said path of travel.

7. A vehicle washing apparatus for automobiles and the like, comprising an elongated beam, means for supporting the beam in elevated substantially horizontally extending position in substantially vertical alignment over such a vehicle to be washed, means for spraying cleaning solution on such a vehicle, said last mentioned means including a substantially inverted U-shaped spray unit, means supporting the spray unit on said beam for movement longitudinally along the latter, and means for moving said spray unit longitudinally of said beam along a predetermined path of travel, said last named means comprising a rack mounted on said beam and extending longitudinally therealong, a gear wheel operatively engaged with said rack, and a motor mounted on said supporting means and operatively connected to said gear wheel for rotating said gear wheel and thereby advancing said housing and said spray unit longitudinally along said rack and said beam, and means operatively connected to said motor for reversing the operation of said motor at each end of said path of travel to thereby reverse the movement of said spray unit on said beam at each end of said path of travel.

8. The vehicle washing apparatus defined in claim 7 and in which said means for supporting said beam comprises two substantially upright supporting members connected to said beam and projecting therefrom and adapted to be operatively connected to a horizontally disposed support for thereby supporting said beam from said support.

9. The vehicle washing apparatus defined in claim 7 and in which said means for supporting said beam comprises two substantially upright supporting members connected at their upper end portions to respective end portions of said beam, one of said supporting members having an arch-way defined therein through which an automobile to be washed may be moved into substantially parallel relation to said beam in vertical alignment therewith.

10. In a vehicle washing apparatus for automobiles and the like, an elongated beam, means for supporting the beam in elevated substantially horizontally extending position, a substantially inverted U-shaped spray unit, said spray unit comprising two substantially inverted L-shaped sections projecting from opposite sides of said beam, means mounted on said spray unit and said beam for movably supporting said spray unit on said beam for movement longitudinally along the latter, said last mentioned means including two shafts, each of said shafts being mounted on a corresponding one of said sections and rotatably connected to said beam, means mounted on said last named means for reciprocating said spray unit longitudinally of said beam along a predetermined path of travel, and means for oscillating said two sections of said spray unit toward and away from each other at each end of said path of travel during movement of said spray unit longitudinally of said beam, said last named means comprising two rods, each of said rods projecting laterally from a respective one of said two shafts, two abutment members, each of said abutment members mounted on a respective end portion of said beam in position to engage said rod members adjacent the end of said path of travel during said reciprocation of said spray unit, two pairs of plates pivotally connected to said supporting means, two springs, each of said springs connected to said plates in a corresponding pair in position to urge said plates to pivot toward each other, two other abutment members, each of said other abutment members being mounted on said spray unit supporting means and projecting between said two plates in a corresponding one of said pairs to thereby restrain movement of said plates in said pair toward each other, and additional abutment members, each of said additional abutment members being mounted on a respective one of said plates in position to engage a respective side of one of said rod members, said last mentioned abutment on the plates in each of said pairs being disposed in position to engage opposite sides of a respective one of said rod members.

11. A vehicle washer for automobiles and the like, comprising elongated supporting means, a spray unit mounted on said means for movement longitudinally thereof, said spray unit having two sections disposed in position relative to each other for movement along opposite sides of such a vehicle during said movement longitudinally of said supporting means, drive means operatively connected to said spray unit for reciprocating said spray unit longitudinally of said supporting means along a predetermined path of travel, and means for effecting swinging movement of said sections of said spray unit transversely to the length of said supporting means at each end portion of said path of travel, said means for effecting swinging movement comprising two abutment members mounted on said sections and movable therewith along said path of movement, and two other abutment members mounted on said elongated supporting means, each of said other abutment members being mounted on a respective end of said supporting means adjacent a corresponding end of said path of movement and in position to engage said rods when said sections are moved along said path of movement to within a predetermined distance from said corresponding end thereof.

12. In a vehicle washer for automobiles and the like, comprising substantially horizontally extending elongated supporting means, a spray unit, said spray unit comprising two sections disposed on opposite sides of said supporting means, other means mounted on said supporting means and operatively connected to said sections and pivotally supporting said sections in substantially vertically extending position on said elongated supporting means for movement longitudinally of the latter, drive means operatively connected to said spray unit and said elongated supporting means for reciprocating said spray unit and said other means longitudinally of said supporting means along a predetermined path of travel, and means for effecting swinging movement of said sections toward and away from each other at each end of said path of travel, said last named means comprising two pairs of elongated plate members, said plate members in each pair of plate members being pivotally connected at one end to said other means for swinging movement toward and away from each other, abutment members, each of said abutment members being mounted on and carried by a respective one of said plate members, spring means connected between said plates in each of said pairs and yieldingly urging said plates in said pair toward each other, other abutment means mounted on said other means and projecting between said plates in each of said pairs in position to engage the latter to thereby limit such movement of said plates toward each other, two rods, each of said rods being mounted on a corresponding one of said sections and projecting between said first named abutments on a respective one of said pairs of plates in position to be engaged by said first named abutments and thereby urged by said springs toward a predetermined normal position, and additional abutment members mounted on said elongated supporting means in position to engage said rods during a final predetermined portion of the movement of said spray unit at a respective end of said path of travel to thereby push said rods and thereby push said sections in an arc around said other means and swing said sections toward each other on said beam.

13. A vehicle washer for automobiles and the like, said washer comprising an elongated I-beam having a top flange, a bottom flange, and an interconnecting substantially upright web, means for supporting said beam in elevated, substantially horizontally extending position, a substantially inverted U-shaped spray unit, said spray unit comprising two substantially inverted L-shaped sections projecting laterally from opposite sides of said beam, a housing, means movably supporting said housing on said beam for reciprocation longitudinally along the latter, said last named means comprising two sets of rollers mounted on said housing and operatively engaged with said upper and lower flanges, each of said sets being disposed on respective sides of said web, means for movably supporting said spray unit from said housing in depending relation thereto, said last named means comprising two shafts journaled on said housing and operatively connected to respective ones of said sections of such spray unit, means for moving said housing and said spray unit longitudinally of said beam along a predetermined path of travel, said last named means comprising a rack mounted on said beam and extending longitudinally therealong, a gear wheel operatively engaged with said rack, and a motor mounted on said housing and operatively connected to said gear wheel for rotating said gear wheel and thereby advancing said housing and spray unit longitudinally along said rack and said beam, means for reversing the operation of said motor to thereby reverse the movement of said housing and spray unit at each end of said path of travel, said last named means comprising a control switch operatively connected to said motor and having a control member thereon movable between two positions for reversing the operation of said motor, and two push rods, each of said push rods being mounted on said beam adjacent respective ends of said path of travel and projecting from said beam into position to operatively engage said control member and move said control member from one of said positions to the other when said spray unit and housing reach said respective end of said path of travel to thereby reverse the operation of said motor and reverse the movement of said spray unit and housing along said beam, and means for oscillating said two sections of said spray unit toward and away from each other at each end of said path of travel during movement of said housing and spray unit longitudinally of said beam, said last named means comprising two rod members, each of said rod members projecting laterally from a respective one of said two shafts, two abutment members, each of said abutment members mounted on a respective end portion of said beam in position to engage said rod members adjacent the end of said path of travel during said reciprocation of said housing and said spray unit, two pairs of plates pivotally connected to said housing, two springs, each of said springs connected to said plates in a corresponding pair to urge said plates to pivot toward each other, two other abutment members, each of said other abutment members being mounted on said housing and projecting between said two plates in a corresponding one of said pairs to thereby restrain movement of said plates in said pair toward each other, and other abutment members, each of said last mentioned abutment members being mounted on a respective one of said plates in position to engage a respective side of one of said rod members with said last mentioned abutment members on the plates in each of said pairs being disposed in position to engage opposite sides of a respective one of said rod members.

References Cited in the file of this patent

UNITED STATES PATENTS

| Number | Name | Date |
|---|---|---|
| Re. 23,294 | Hopper et al. | Nov. 21, 1950 |
| 2,194,071 | Hine | Mar. 19, 1940 |

FOREIGN PATENTS

| Number | Country | Date |
|---|---|---|
| 55,018 | Netherlands | Dec. 10, 1938 |
| 274,546 | Great Britain | July 15, 1927 |
| 384,418 | Great Britain | Dec. 8, 1932 |